Jan. 28, 1969   L. J. SCHLINK   3,424,352
APPARATUS FOR DISCHARGE AND CLEANOUT OF PULVERULENT
MATERIAL FROM TANK CARS
Filed June 8, 1967   Sheet 1 of 2
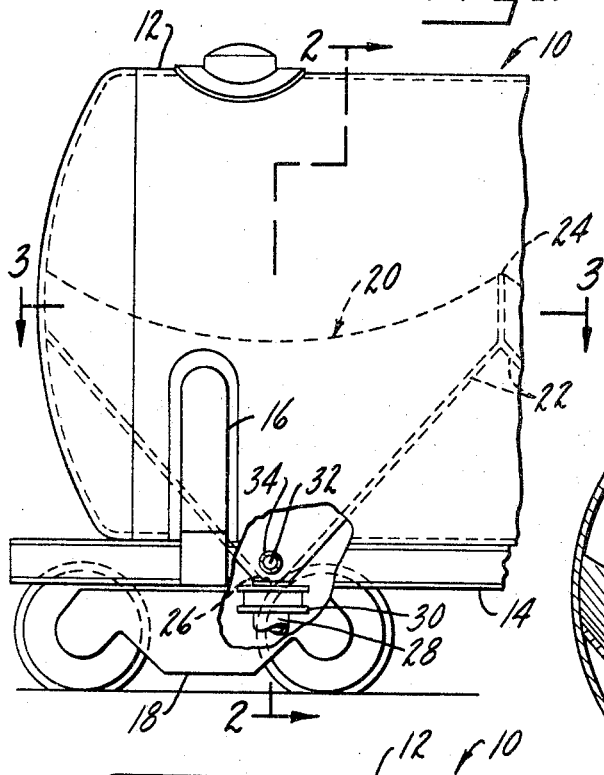
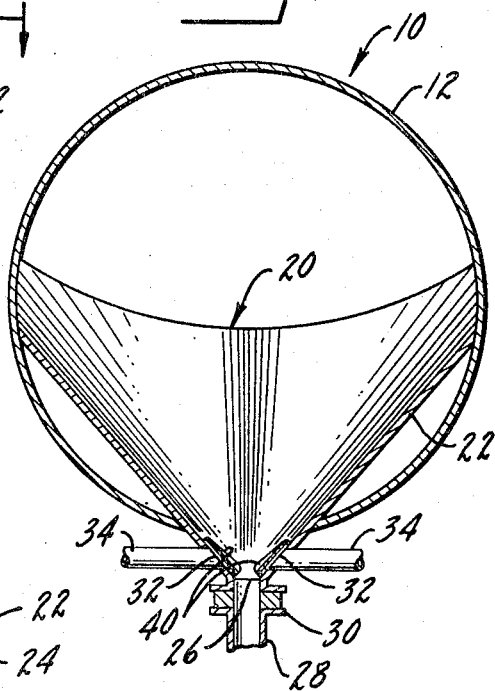
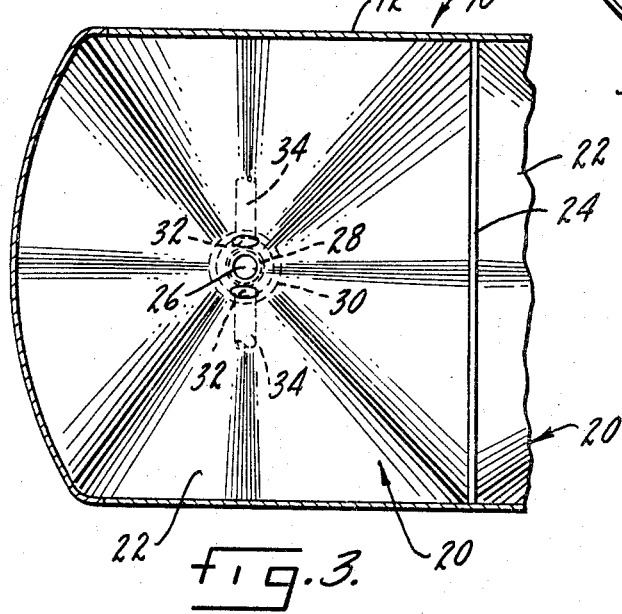
INVENTOR.
Laurence J. Schlink,
BY Hume, Clement, Hume & Lee
Attorneys.

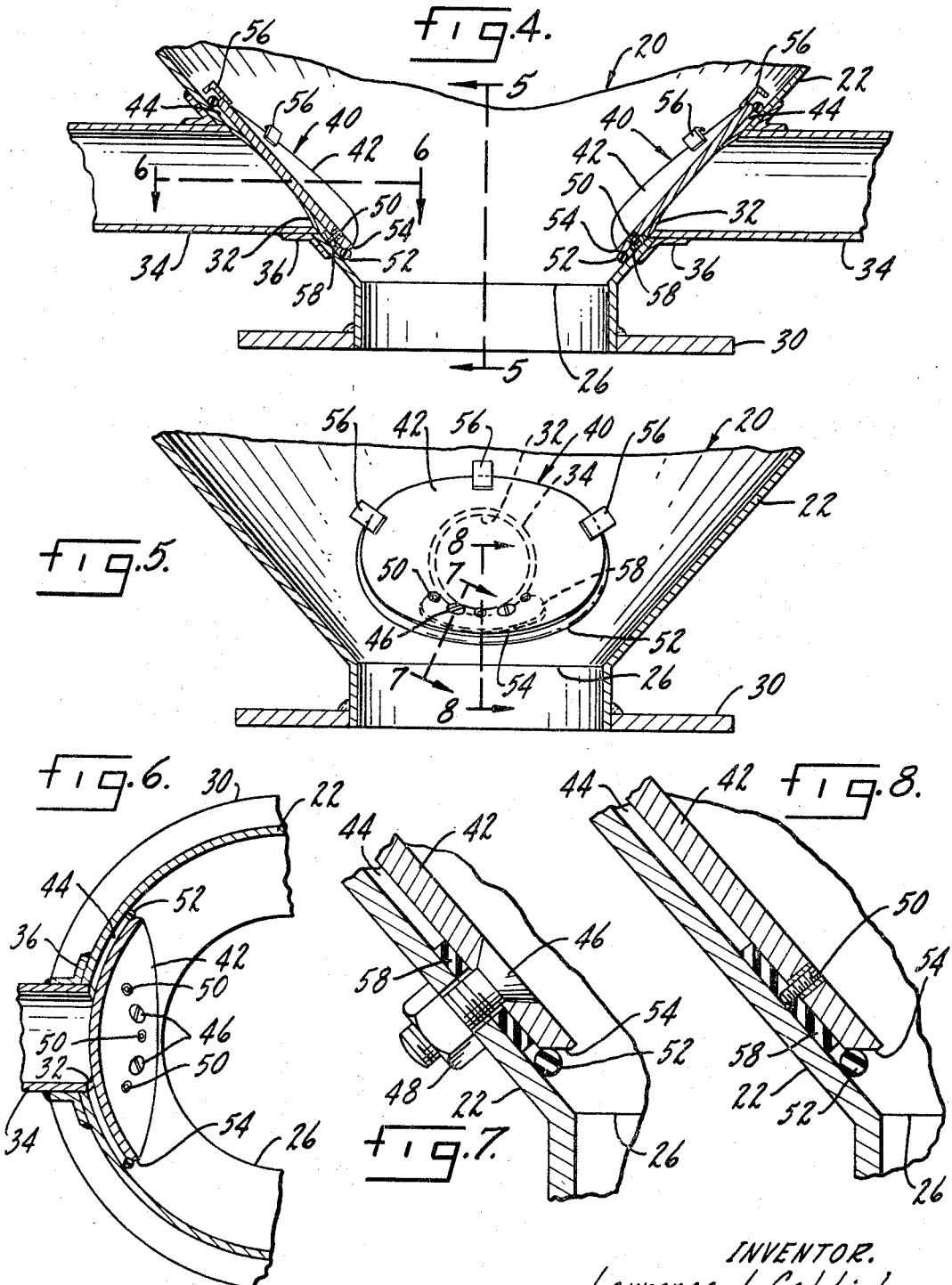

United States Patent Office 3,424,352
Patented Jan. 28, 1969

3,424,352
APPARATUS FOR DISCHARGE AND CLEANOUT OF PULVERULENT MATERIAL FROM TANK CARS
Laurence J. Schlink, Chicago, Ill., assignor, by mesne assignments, to Union Tank Car Company, Chicago, Ill., a corporation of Delaware
Filed June 8, 1967, Ser. No. 644,732
U.S. Cl. 222—195
Int. Cl. B67d 5/54; B65c 69/08
8 Claims

ABSTRACT OF THE DISCLOSURE

Apparatus for pressurized discharge and cleanout of pulverulent material from a hopper. The hopper has a discharge port for removing the material, and an adjacent gas inlet. A plate covers the inlet and is slightly spaced from the hopper wall. The edge of the plate is chamfered, and an O-ring rests against the chamfered edge and the wall. When pressurized gas is introduced at the inlet, the O-ring moves up the chamfered edge, allowing a thin, high-velocity stream of gas to sweep along the hopper walls. The spacing between the plate and the wall may be varied, and the gas stream may be directed by a baffle.

*Background—Summary—Drawings*

This invention relates to apparatus for effecting the pressurized discharge and cleanout of materials from containers and, more particularly, to improved apparatus for the discharge and cleanout of pulverulent or granular materials from storage or transportation containers using high-velocity gas streams.

Although the invention will be described in the environmental context of hopper-type railroad tank cars, it will be understood that the improved apparatus disclosed and claimed herein may be effectively employed wherever it is desired to discharge powdery materials from containers, such as hoppers, bins, tanks and the like.

As will be appreciated by those skilled in the art, various granular or pulverulent materials tend to adhere to or bridge across the sloping walls of the generally conical hopper compartments of railroad tank cars which are typically employed to transport such materials. Consequently, it is desirable to provide means for effecting fluidized discharge of such materials through the use of techniques which insure the breakup and cleanout of adhering masses of material. One effective method which employs such techniques is disclosed and claimed in Patent No. 3,375,043, issued Mar. 26, 1968, which was filed Jan. 20, 1966, and which is assigned to the assignee of the present invention. As disclosed therein, adhering masses of powdery material may be removed from compartment walls by providing a gas inlet in the compartment wall and covering the inlet with a spaced deflector plate. Gas striking the deflector plate is thus directed in a thin, high-velocity film or stream along the compartment wall so as to break up and dislodge adhering material.

The present invention is directed to improvements in presurized discharge systems such as that described above. In operating such pressurized discharge systems, under certain conditions the pressure in the hopper compartment itself may exceed that present at the gas inlet. Under such conditions, it is imperative to provide check means for insuring that the powdery material is not forced into the gas inlet. Moreover, in connection with the storage or transportation of certain materials, it is necessary to provide closure means for insuring that the material does not leak into the gas inlet under quiescent conditions. Further, it is desirable to provide means for varying the spacing between the deflector plate and the hopper compartment walls so that the velocity of the gas stream may be controlled. Finally, in certain applications it may be important to provide means for directing the gas flow away from the material discharge port so as to insure complete fluidizing of the material within the compartment.

In accordance with the present invenion, the foregoing and other objects are achieved by providing discharge and cleanout apparatus which has as one of its principal structural features an improved deflector assembly associated with the gas inlet in a hopper compartment. The deflector assembly includes a deflector plate which is positioned over the gas inlet and spaced from the hopper compartment wall to define a gas passageway. The periphery of the deflector plate is provided with inclined plane means which cooperate with a peripheral O-ring to provide automatic closure means for the gas passageway. Thus when the fluid pressure in the hopper compartment is equal to or greater than the pressure at the gas inlet, the O-ring serves to close the gas passageway, thereby preventing the flow of material into the gas inlet. However, when the gas pressure at the gas inlet becomes greater than the hopper compartment pressure, the O-ring is forced to move along the inclined plane, thus opening the gas passageway. Also in accordance with the invention, means may be provided to vary the spacing between the hopper compartment wall and the deflector plate, and baffle means may be provided to direct the gas flow away from the hopper discharge port and to vary the gas flow pattern.

Additional objects and features, as well as a more complete understanding of the present invention, will be gained from a consideration of the remainder of the specification, with illustrative reference to the drawings, in which:

FIGURE 1 is a fragmentary elevational view of an end portion of a hopper-type railroad tank car embodying the features of the present invention;

FIGURE 2 is a cross sectional view taken along the line 2—2 in FIGURE 1;

FIGURE 3 is a cross sectional view taken along the line 3—3 in FIGURE 1;

FIGURE 4 is an enlarged fragmentary sectional view depicting a preferred form of a pressurized discharge and cleanout apparatus constructed in accordance with the present invention;

FIGURE 5 is a cross sectional view taken along the line 5—5 in FIGURE 4;

FIGURE 6 is a cross sectional view taken along the line 6—6 in FIGURE 4;

FIGURE 7 is a cross sectional view taken along the line 7—7 in FIGURE 5; and

FIGURE 8 is a cross sectional view taken along the line 8—8 in FIGURE 5.

*Description of exemplary embodiment*

With reference to FIGURES 1 through 3, there is shown in idealized form one end portion of a conventional hopper-type railroad tank car, generally denoted by the numeral 10. The tank car 10 includes a cylindrical tank or body 12 which is supported on a chassis 14 by a suitable saddle support structure 16. The chassis 14 rests upon a conventional undercarriage or wheel assembly 18.

The tank car 10 is preferably constructed so that a plurality of generally conically shaped hopper compartments 20 are provided along at least the lower half of the interior of the cylindrical tank 12. The hoppers 20 are defined by walls 22 and partitions 24 which are welded or otherwise suitably secured to the interior surface of the tank 12. Each of the hoppers 20 terminates, at its lower end, in a discharge port 26 which is connected to a discharge conduit 28 by a suitable connector 30.

Each of the hoppers 20 likewise includes a pair of gas inlets 32 which communicate with gas lines 34. In this connection, it should be understood that although two such gas inlets 32 are depicted here, one or more such inlets might be employed in a particular tank car hopper or other transportation or storage container, and the number will depend upon the size and shape of the container, the material confined therein, and other factors which will be readily understood by persons having familiarity with the art. Associated with each of the gas inlets 32 is a deflector assembly 40, the construction and function of which will be described in greater detail below.

When it is desired to discharge material from the hopper 20, the discharge conduit 28 is connected to a conventional material receiving system (not shown) and the gas lines 34 are connected to a source (not shown) of air or other suitable fluidizing gas. The gas enters the hopper compartment 20 through the gas inlets 32 and is distributed by the deflector assemblies 40, in a manner which will become apparent hereinafter, so as to cause fluidization of the material within the tank 12. The fluidized material is simultaneously withdrawn from the hopper 20 through the discharge port 26 and the discharge conduit 28.

Turning now to FIGURES 4 through 8, there is shown in greater detail a preferred form of deflector assembly 40 constructed in accordance with the present invention. As best shown in FIGURES 4 and 6, the gas lines 34 are connected to the hopper compartment walls 22 by means of collars 36 which are secured by welding or other suitable means. The gas lines 34 communicate with apertures in the hopper walls 22 so as to define the gas inlets 32. The deflector assemblies 40 cover the gas inlets 32 and are maintained in slightly spaced relationship from the walls 22.

Each of the deflector assemblies 40 includes a generally oval or circular plate member 42 which covers the gas inlet 32 and which is spaced apart from the hopper wall 22 so as to define a narrow gas passageway 44. The plate 42, which is preferably curved to correspond to the curvature of the hopper wall 22, is attached to the wall by means of a pair of bolts 46 and nuts 48. The spacing of the plate 42 from the wall 22 may be varied by manipulation of a series of set screws 50 as best seen in FIGURE 8.

Associated with the periphery of the plate 42 is a resilient O-ring 52, which is preferably formed of an elastomeric material. As best shown in FIGURES 7 and 8, the periphery of the plate 42 has a chamfered edge 54 which forms an inclined plane surface at an acute angle to the hopper wall 22. As can be seen from the drawing, the O-ring 52 extends around the periphery of the plate 42 and simultaneously contacts the chamfered edge 54 and the wall 22, thus providing a closure for the gas passageway 44. As shown in FIGURES 4 and 5, a series of generally L-shaped stop members 56 are attached to the plate 42 and provide means for preventing overtravel of the O-ring 52 on the chamfered edge 54, as will become apparent below.

Interposed between the plate 42 and the wall 22 is a generally arcuate gasket 58 which serves as a baffle to provide directional flow for gas within the passageway 44. The gasket 58 is preferably formed of a suitably resilient material, so that some degree of variable spacing between the plate 42 and the wall 22 may be achieved without changing to another size gasket.

In accordance with the invention, the deflector assembly 40 operates to provide a directional gas flow along the hopper wall 22, and the O-ring 52 and chamfered edge 54 coact to provide an automatic check means for preventing backflow of material into the gas line 34. Under normal quiescent conditions, such as during transportation or storage, the fluid pressure within the hopper compartment 20 will be at least equal to the pressure at the gas inlet 32. Under such conditions, the O-ring 52 will, due to its natural resiliency, press tightly against both the wall 22 and the chamfered edge 54 around the entire periphery of the plate 42, thus preventing any of the material in the hopper compartment from entering the gas line 34.

When it is desired to effect discharge and cleanout of material within the hopper compartment 20, pressurized gas is introduced into the gas line 34. The gas fills the passageway 44 and exerts a radially outward force on the O-ring 52. This force causes the O-ring 52 to move up the inclined plane defined by the chamfered edge 54 of the plate 42. This results in opening the passageway 44 so that gas may escape radially outwardly from under the plate 42. Due to the relative narrowness of the gas passageway 44, the gas is ejected around the periphery of the plate 42 in a thin, high-velocity stream which sweeps along the hopper compartment wall 22 thus causing break-up and dispersal of material which may be adhered to the compartment wall. Due to the placement and configuration of the gasket 58, the gas stream pattern is generally fan-shaped, and tends to sweep along substantially the entire surface of the compartment wall 22. The gasket 58, however, prevents direct short-circuiting of gas flow from the inlet 32 to the discharge port 26, thus insuring optimum fluidizing and cleaning utilization of the incoming gas flow.

If, at any point during the discharge operation, the fluid pressure in the hopper compartment 20 should exceed the pressure at the inlet 32, the resultant force on the O-ring 52 will be directed radially inwardly of the plate 42 and will thus cause the O-ring to move back down the chamfered edge 54 and close the gas passageway 44. In this manner, back flow of fluidized material from the hopper compartment 20 into the gas line 34 is automatically checked. The stop members 56 provide a barrier against overtravel of the O-ring 52 so that the O-ring will maintain contact with the chamfered edge 54 regardless of the pressure conditions at the inlet 32.

As is apparent from the foregoing, the variable spacing feature provided by the set screws 50 allows substantial flexibility in adapting the deflector assembly 40 for use with pulverulent materials of varying character. Moreover, the size and configuration of the gasket 58 may be readily altered to provide any desired modification of the gas stream pattern.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

I claim:
1. Apparatus for effectuating pressurized discharge and cleanout of material from a compartment having a discharge port, said apparatus comprising: means defining at least one gas inlet in a wall of said compartment; plate means covering said inlet and spaced from said wall to define a gas passageway between said plate means and said wall communicating with said compartment, said plate means being chamfered around its peripheral edge at an acute angle with said wall; and an elastomeric O-ring positioned on said chamfered edge of said plate means for sealing contact with said wall.

2. Apparatus in accordance with claim 1 including means for adjusting the spacing between said wall and said plate means.

3. Apparatus in accordance with claim 1, including baffle means disposed between said plate means and said wall to partially block said gas passageway and provide directional flow for gas entering said compartment from said passageway.

4. Apparatus in accordance with claim 1, including stop means for preventing over-travel of said O-ring on said chamfered edge of said plate means.

5. Apparatus for effecting the pressurized discharge and cleanout of material from a hopper-type railroad tank car wherein at least a substantial portion of the material is confined within at least one hopper compartment in said car, said apparatus comprising: means defining a material discharge port at the lowermost extremity of said compartment; means defining at least one gas inlet in a wall of said compartment near said discharge port; plate means covering said inlet and spaced from said wall to define a gas passageway between said plate means and said wall, said plate means coacting with said inlet such that gas entering said passageway from said inlet will be ejected from said passageway radially outwardly from under said plate means in a thin high-velocity stream along said wall, said plate means being chamfered around its peripheral edge at an acute angle with said wall; and an elastomeric O-ring positioned on said chamfered edge of said plate means to close said passageway until the pressure at said inlet exceeds the pressure in said compartment.

6. Apparatus in accordance with claim 5, including means for adjusting the spacing between said wall and said plate means.

7. Apparatus in accordance with claim 5, including baffle means disposed between said plate means and said wall to partially block said gas passageway so that gas is ejected from said passageway along said wall in a substantially fan-shaped pattern upwardly away from said discharge port.

8. Apparatus in accordance with claim 5, including stop means for preventing over-travel of said O-ring on said chamfered edge of said plate means.

References Cited

UNITED STATES PATENTS

| | | | |
|---|---|---|---|
| 2,614,793 | 10/1952 | Storm | 137—525 |
| 2,787,400 | 4/1957 | Fritsch | 137—525 X |
| 2,884,230 | 4/1959 | Pyle et al. | 222—195 X |
| 3,216,451 | 11/1965 | Smallpeice | 137—525 X |

STANLEY H. TOLLBERG, *Primary Examiner.*

U.S. Cl. X.R.

137—525